(12) United States Patent
Edelsburg et al.

(10) Patent No.: US 12,283,276 B2
(45) Date of Patent: Apr. 22, 2025

(54) VOICE NOTES WITH TRANSCRIPTION

(71) Applicant: Snap Inc., Santa Monica, CA (US)

(72) Inventors: Alex Edelsburg, Seattle, WA (US);
Kyle Goodrich, Venice, CA (US);
Pedram Javidpour, Los Angeles, CA (US); Andrew James McPhee, Culver City, CA (US); Daniel Moreno, Los Angeles, CA (US); Jeremy Baker Voss, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 254 days.

(21) Appl. No.: 17/646,271

(22) Filed: Dec. 28, 2021

(65) Prior Publication Data

US 2023/0206921 A1   Jun. 29, 2023

(51) Int. Cl.
| | |
|---|---|
| *G06F 3/04886* | (2022.01) |
| *G06F 3/0481* | (2022.01) |
| *G06F 3/04883* | (2022.01) |
| *G06F 3/16* | (2006.01) |
| *G10L 15/26* | (2006.01) |
| *H04L 51/10* | (2022.01) |

(52) U.S. Cl.
CPC ............ *G10L 15/26* (2013.01); *G06F 3/0481* (2013.01); *G06F 3/04883* (2013.01); *G06F 3/04886* (2013.01); *G06F 3/165* (2013.01); *H04L 51/10* (2013.01)

(58) Field of Classification Search
CPC ... G10L 15/26; G06F 3/0481; G06F 3/04883; G06F 3/04886; G06F 3/165; H04L 51/10

USPC .................. 704/201, 214, 231, 246
See application file for complete search history.

(56) References Cited

U.S. PATENT DOCUMENTS

| | | |
|---|---|---|
| 10,431,216 B1 | 10/2019 | Lemon et al. |
| 2011/0035220 A1* | 2/2011 | Opaluch ................ G10L 15/26 704/E15.001 |
| 2015/0350147 A1* | 12/2015 | Shepherd ............... H04L 51/02 715/752 |
| 2017/0085506 A1 | 3/2017 | Gordon |
| 2022/0188504 A1* | 6/2022 | Singh .................... G06F 40/186 |

FOREIGN PATENT DOCUMENTS

| | | |
|---|---|---|
| CN | 118476205 | 8/2024 |
| WO | 2023129379 | 7/2023 |

OTHER PUBLICATIONS

"International Application Serial No. PCT US2022 052825, International Search Report mailed Apr. 26, 2023", 4 pgs.

(Continued)

*Primary Examiner* — George C Monikang
(74) *Attorney, Agent, or Firm* — Schwegman Lundberg & Woessner, P.A.

(57) ABSTRACT

A messaging system, which hosts a backend service for an associated messaging client application, includes a voice notes system that addresses the technical problem of serving an audio message to the recipient in a manner that permits the recipient to consume the message in a text format as a transcription. A chat user interface (UI) provided with the voice notes system permits a user to play an audio message or request generation of the transcription of the audio message on-demand to prevent unnecessary cluttering of the UI real estate.

20 Claims, 9 Drawing Sheets

(56) References Cited

OTHER PUBLICATIONS

"International Application Serial No. PCT US2022 052825, Written Opinion mailed Apr. 26, 2023", 4 pgs.
"International Application Serial No. PCT US2022 052825, International Preliminary Report on Patentability mailed Jul. 11, 2024", 6 pgs.

\* cited by examiner

VOICE NOTES WITH TRANSCRIPTION

TECHNICAL FIELD

The present disclosure generally relates to facilitating interactions between client devices over a network.

BACKGROUND

The popularity of computer-implemented tools that permit users to access and interact with content and other users online continues to grow. For example, various computer-implemented tools exist that permit users to interact and share content with other users through messaging applications. Some of such computer-implemented tools, termed applications or apps, can be designed to run on a mobile device such as a phone, a tablet, or a watch.

Existing messaging applications permit users to exchange text messages, as well as multimedia messages. For example, a messaging app may include functionality that permits a sender to dictate an audio message and then send it to a recipient. The recipient, upon receiving the message can play the associated audio by interacting with a visual control representing the received audio message.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some examples are illustrated by way of example, and not limitation, in the figures of the accompanying drawings in which.

DETAILED DESCRIPTION

Examples of the present disclosure improve the functionality of electronic messaging software and systems by enhancing users' experience with applications that provide text messaging in combination with an option to dictate a message so that the resulting audio message is communicated to the intended recipient device. An option to dictate a message may be indicated on a text messaging user interface (UI) in the form of a microphone icon, for example. At the recipient device, the received audio message can be played in response to detecting activation of an associated user-selectable element on the text messaging UI. In certain circumstances, while recording an audio instead of typing the message is a convenient option for the sender, the recipient may not be willing to listen to the audio or they find themselves in a situation where playing the audio is less than desirable, such as when the recipient is in a space where silence is requested or in a noisy place. In these situations, the recipient may have to wait until they are in a space appropriate for playing the audio, which may be a frustrating experience.

The technical problem of serving an audio message in a manner that permits the recipient to consume the message, which was captured and communicated as an audio, in a text format as a transcription, in addition to or instead of the audio format, is addressed by providing a voice notes system.

The voice notes system may be integrated with a messaging system that hosts a backend service for an associated messaging client. The messaging client is configured to present a chat user interface (UI) that permits users to communicate via text messages and audio messages. An audio message created in the messaging system using the chat UI may be referred to as a voice note for the purposes of this description. An example of a messaging system is described further below with reference to FIG. 1-3. While the voice notes platform is described below in the context of a messaging system, the methodologies described herein can be used advantageously in various computer implemented applications that permit recording and communicating voice notes.

Networked Computing Environment

Figure 1:
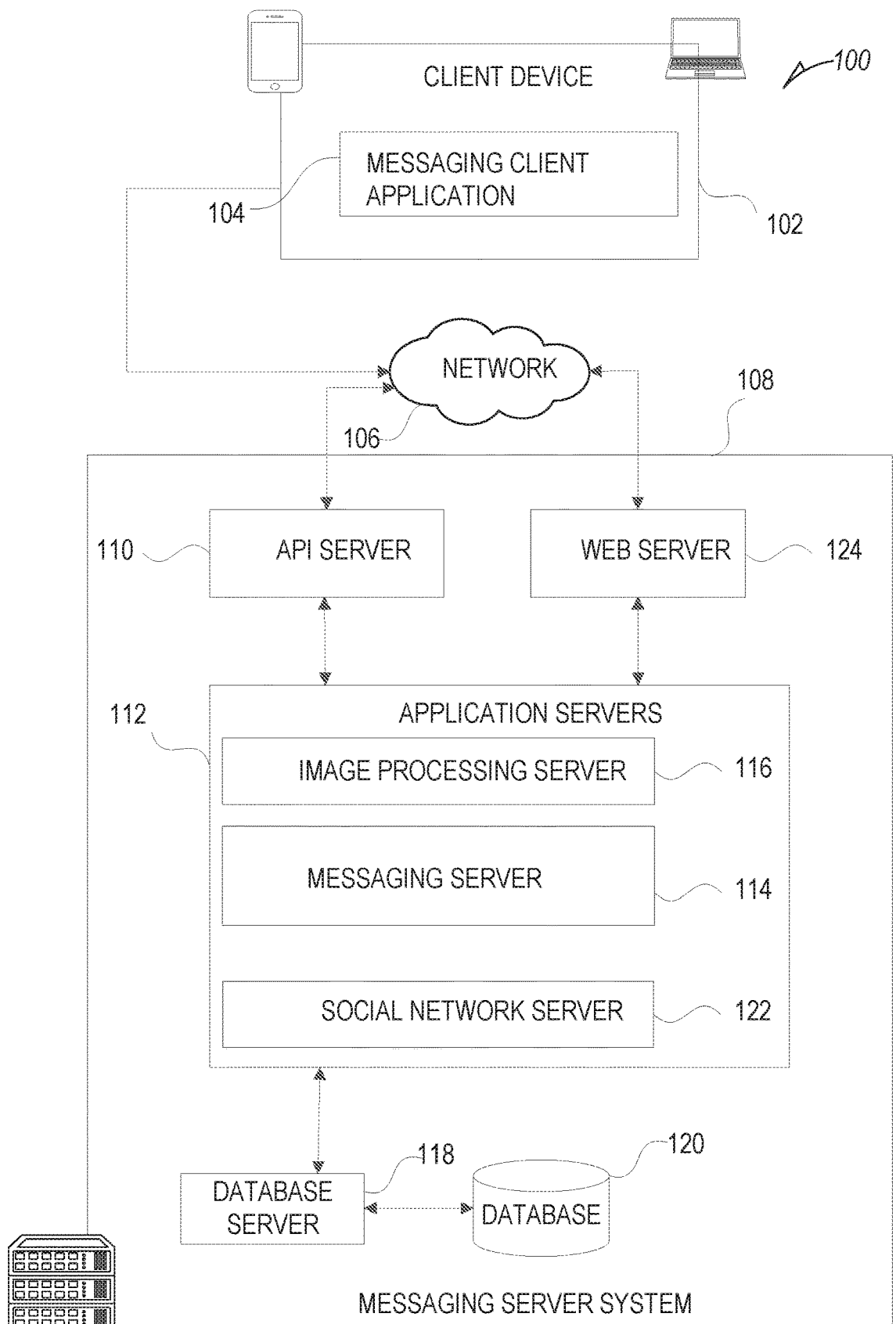
FIG. 1 is a diagrammatic representation of a networked environment in which the present disclosure may be deployed, in accordance with some examples.

FIG. 1 is a block diagram showing an example messaging system 100 for exchanging data (e.g., messages and associated content) over a network, within which a voice notes system can be implemented. The messaging system 100 includes multiple instances of a client device 102, each of which hosts a number of applications, including a messaging client application 104. Each messaging client application 104 is communicatively coupled to other instances of the messaging client application 104 and a messaging server system 108 via a network 106 (e.g., the Internet). The messaging client application 104 is implemented by one or more processors of the client device 102 and is supported by the backend system, which is the messaging server system 108.

A messaging client application 104 is able to communicate and exchange data with another messaging client application 104 and with the messaging server system 108 via the network 106. The data exchanged between messaging client application 104, and between a messaging client application 104 and the messaging server system 108, includes functions (e.g., commands to invoke functions) as well as payload data (e.g., text, audio, video or other multimedia data).

The messaging server system 108 provides server-side functionality via the network 106 to a particular messaging client application 104. While certain functions of the messaging system 100 are described herein as being performed by either a messaging client application 104 or by the messaging server system 108, the location of certain functionality either within the messaging client application 104 or the messaging server system 108 may be a design choice. For example, it may be technically preferable to initially deploy certain technology and functionality within the messaging server system 108 but to later migrate this technology and functionality to the messaging client application 104 where a client device 102 has sufficient processing capacity.

The messaging server system 108 supports various services and operations that are provided to the messaging client application 104. Such operations include transmitting data to, receiving data from, and processing data generated by the messaging client application 104. This data may include message content, client device information, geolocation information, media augmentation and overlays, message content persistence conditions, social network information, and live event information, as examples. Data exchanges within the messaging system 100 are invoked and controlled through functions available via user interfaces (UIs) of the messaging client application 104.

Turning now specifically to the messaging server system 108, an Application Program interface (API) server 110 is coupled to, and provides a programmatic interface to, application servers 112. The application servers 112 are communicatively coupled to a database server 118, which facilitates access to a database 120 that stores data associated with messages processed by the application servers 112. For example, the database 120 stores audio content from voice chat messages associated with the respective sender identifications, with or without the associated text. For the purposes of this description, a voice chat message includes an audio message (or a reference to the audio message) and the associated text representation of the audio. The audio content from a voice chat message may persist until an instruction to delete the voice chat message is received at the messaging system 108.

Similarly, a web server 124 is coupled to the application servers 112, and provides web-based interfaces to the application servers 112. To this end, the web server 124 processes incoming network requests over the Hypertext Transfer Protocol (HTTP) and several other related protocols.

The Application Program Interface (API) server 110 receives and transmits message data (e.g., commands and message payloads) between the client device 102 and the application servers 112. Specifically, the Application Program Interface (API) server 110 provides a set of interfaces (e.g., routines and protocols) that can be called or queried by the messaging client application 104 in order to invoke functionality of the application servers 112. The Application Program Interface (API) server 110 exposes various functions supported by the application servers 112, including account registration, login functionality, the sending of messages, via the application servers 112, from a particular messaging client application 104 to another messaging client application 104, the sending of media files (e.g., images or video) from a messaging client application 104 to a messaging server 114, and for possible access by another messaging client application 104, the settings of a collection of media data (e.g., story), the retrieval of a list of friends of a user of a client device 102, the retrieval of such collections, the retrieval of messages and content, the addition and deletion of entities (e.g., friends) to an entity graph (e.g., a social graph), the location of friends within a social graph, and opening an application event (e.g., relating to the messaging client application 104).

The application servers 112 host a number of server applications and subsystems, including for example a messaging server 114, an image processing server 116, and a social network server 122. The messaging server 114 implements a number of message processing technologies and functions, particularly related to the aggregation and other processing of content (e.g., textual and multimedia content) included in messages received from multiple instances of the messaging client application 104. In some examples, the messaging server facilitates voice notes with transcription functionality that enables serving an audio message in a manner that permits the recipient to consume the message, which was captured and communicated as an audio, in a text format as a transcription, in addition to or instead of the audio format. Other processor and memory intensive processing of data may also be performed server-side by the messaging server 114, in view of the hardware requirements for such processing.

The application servers 112 also include an image processing server 116 that dedicated to performing various image processing operations, typically with respect to images or video within the payload of a message sent from or received at the messaging server 114.

Figure 3:
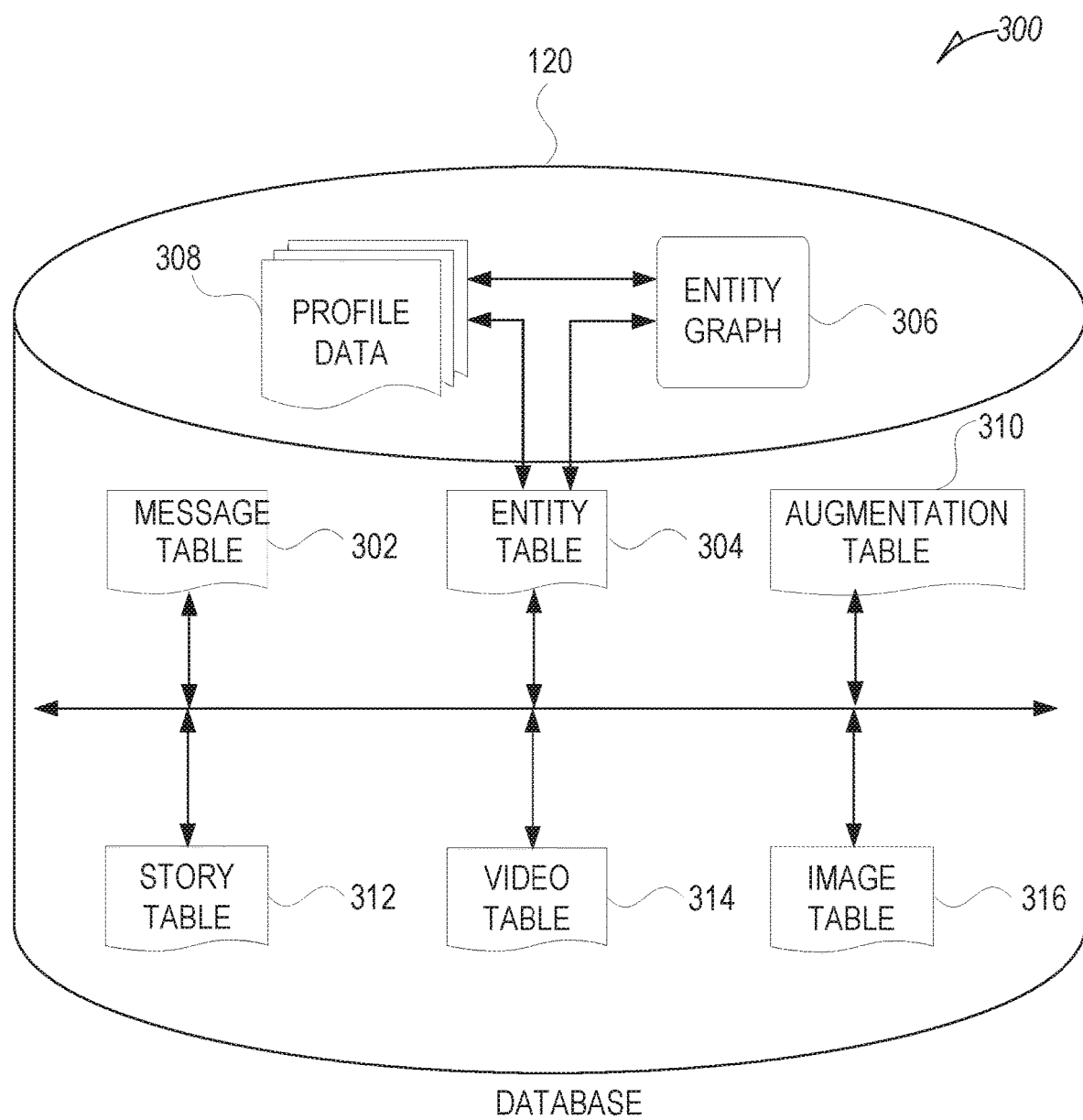
FIG. 3 is a diagrammatic representation of a data structure as maintained in a database, in accordance with some examples.

The social network server 122 supports various social networking functions and services and makes these functions and services available to the messaging server 114. To this end, the social network server 122 maintains and accesses an entity graph 306 (as shown in FIG. 3) within the database 120. Examples of functions and services supported by the social network server 122 include the identification of other users of the messaging system 100 with which a particular user has relationships or is "following," and also the identification of other entities and interests of a particular user.

System Architecture

Figure 2:
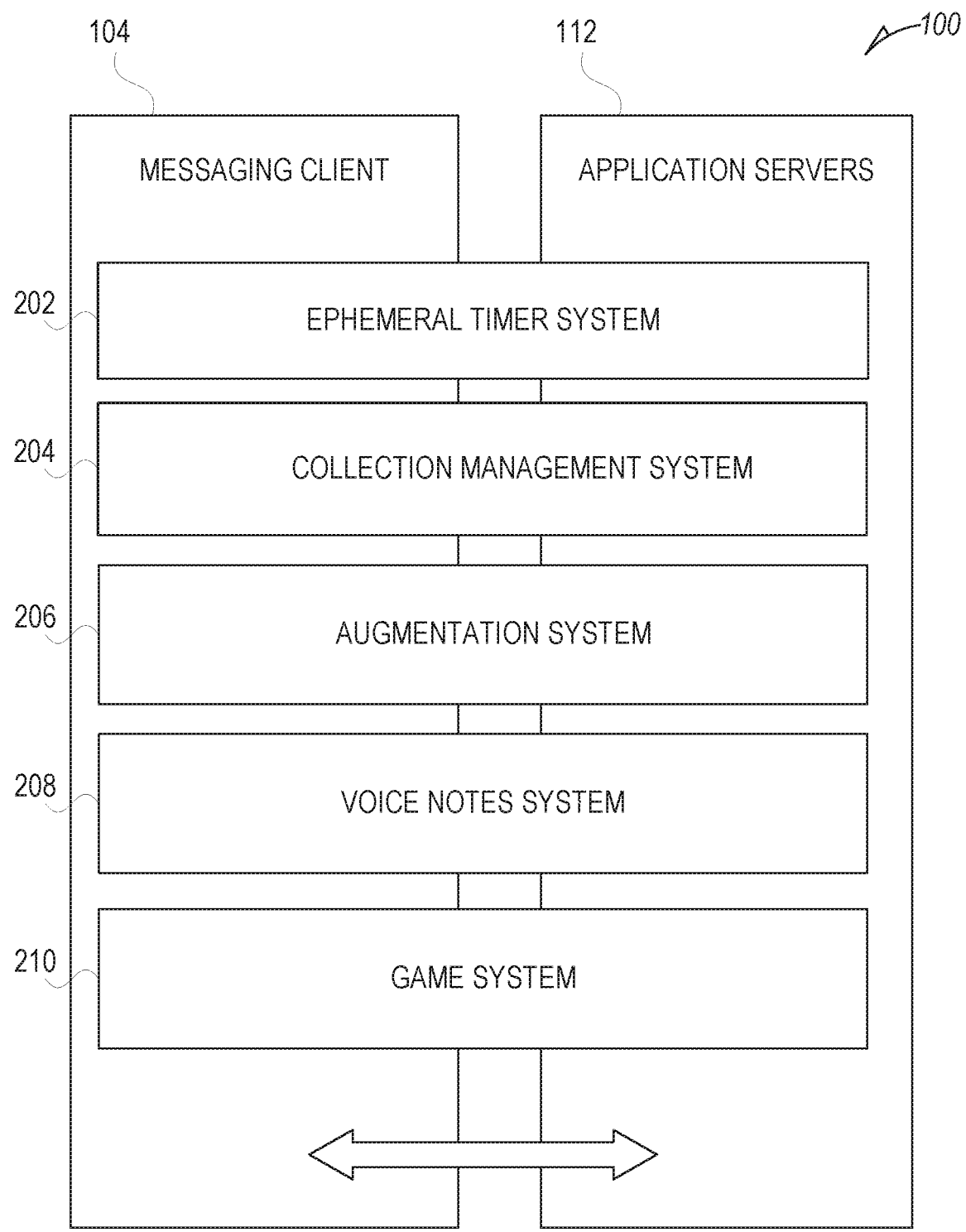
FIG. 2 is a diagrammatic representation of a messaging system, in accordance with some examples, that has both client-side and server-side functionality.

FIG. 2 is a block diagram illustrating further details regarding the messaging system 100, according to some examples. Specifically, the messaging system 100 is shown to comprise the messaging client application 104 and the application servers 112. The messaging system 100 embodies a number of subsystems, which are supported on the client-side by the messaging client application 104 and on the sever-side by the application servers 112. These subsystems include, for example, an ephemeral timer system 202, a collection management system 204, an augmentation system 206, and a game system 210. The ephemeral timer system 202 is responsible for enforcing the temporary or time-limited access to content by the messaging client application 104 and the messaging server 114. The ephemeral timer system 202 incorporates a number of timers that, based on duration and display parameters associated with a message, or collection of messages (e.g., a story), selectively enable access (e.g., for presentation and display) to messages and associated content via the messaging client application 104. Further details regarding the operation of the ephemeral timer system 202 are provided below. The collection management system 204 is responsible for managing sets or collections of media (e.g., collections of text, image video, and audio data). Such a collection may be made available for a specified time period, such as the duration of an event to which the content relates. For example, content relating to a music concert may be made available as a "story" for the duration of that music concert. The augmentation system 206 provides various functions that enable a user to augment (e.g., annotate or otherwise modify or edit) media content associated with a message. For example, the augmentation system 206 provides functions related to the generation and publishing of media overlays for messages processed by the messaging system 100. The augmentation system 206 operatively supplies a media overlay or augmentation (e.g., an image filter) to the messaging client application 104 based on a geolocation of the client device 102. In another example, the augmentation system 206 operatively supplies a media overlay to the messaging client application 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text or image that can be overlaid on top of a photograph taken by the client device 102. The media overlays may be stored in the database 120 and accessed through the database server 118. The game system 210 provides various gaming functions within the context of the messaging client application 104, The messaging client application 104 provides a game interface providing a list of available games that can be launched by a user within the context of the messaging client application 104, and played with other users of the messaging system 100. The messaging system 100 further enables a particular user to invite other users to participate in the play of a specific game, by issuing invitations to such other users from the messaging client application 104. The messaging client application 104 also supports both the voice and text messaging (e.g., chats) within the context of gameplay, provides a leaderboard for the games, and also supports the provision of in-game rewards.

Also shown in FIG. 2 is a voice notes system 208. The voice notes system 208 includes one or more components provided with the messaging client application 104 of FIG. 1, as well as one or more components provided at the messaging server 114 of FIG. 1. The voice notes system 208 is configured to facilitate serving an audio message in a manner that permits the recipient to consume the message, which was captured and communicated as an audio; in a text format as a transcription, in addition to or instead of the audio format. In some examples, the voice notes system 208 is configured to permit playback of an audio message at a speed that is different from a normal playback speed. The voice notes system 208 utilizes speech recognition technology such as Automatic Speech Recognition (ASR) or Speech To Text (STT). Speech recognition technology may be based on the algorithm of acoustic and language modeling, where the acoustic modeling represents the relationship between linguistic units of speech and audio signals and the language modeling matches sounds with word sequences.

Data Architecture

FIG. 3 is a schematic diagram illustrating data structures 300, which may be stored in the database 120 of the messaging server system 108, according to certain examples. While the content of the database 120 is shown to comprise a number of tables, it will be appreciated that the data could be stored in other types of data structures (e.g., as an object-oriented database).

The database 120 includes message data stored within a message table 302, This message data includes, for any particular one message, at least message sender data, message recipient (or receiver) data, and a payload. The payload may include a voice note generated using the chat UI, which is described further below, with reference to FIG. 8. Further details regarding information that may be included in a message, and included within the message data stored in the message table 302 is described below with reference to FIG. 4.

An entity table 304 stores entity data, and is linked (e.g., referentially) to an entity graph 306 and profile data 308. Entities for which records are maintained within the entity table 304 may include individuals, corporate entities, organizations, objects, places, events, and so forth. Regardless of entity type, any entity regarding which the messaging server system 108 stores data may be a recognized entity. Each entity is provided with a unique identifier, as well as an entity type identifier (not shown).

The entity graph 306 stores information regarding relationships and associations between entities. Such relationships may be social, professional (e.g., work at a common corporation or organization) interested-based or activity-based, merely for example.

The profile data 308 stores multiple types of profile data about a particular entity. The profile data 308 may be selectively used and presented to other users of the messaging system 100, based on privacy settings specified by a particular entity. Where the entity is an individual, the profile data 308 includes, for example, a user name, telephone number, address, settings (e.g., notification and privacy settings), as well as a user-selected avatar representation (or collection of such avatar representations). A particular user may then selectively include one or more of these avatar representations within the content of messages communicated via the messaging system 100, and on map interfaces displayed by messaging client applications 104 to other users. The collection of avatar representations may include "status avatars," which present a graphical representation of a status or activity that the user may select to communicate at a particular time.

The database 120 also stores augmentation data, such as overlays or filters, in an augmentation table 310. The augmentation data is associated with and applied to videos (for which data is stored in a video table 314) and images (for which data is stored in an image table 316). Other augmentation data that may be stored within the image table 316 includes augmented reality content items (e.g., corresponding to applying Lenses or augmented reality experiences). An augmented reality content item may be a real-time special effect and sound that may be added to an image or a video.

A story table 312 stores data regarding collections of messages and associated image, video, or audio data, which are compiled into a collection (e.g., a story or a gallery). The creation of a particular collection may be initiated by a particular user (e.g., each user for which a record is maintained in the entity table 304). A user may create a "personal story" in the form of a collection of content that has been created and sent/broadcast by that user. To this end, the user interface of the messaging client application 104 may include an icon that is user-selectable to enable a sending user to add specific content to his or her personal story.

In some examples, the database 120 also stores respective transcriptions of audio messages.

Data Communications Architecture

Figure 4:
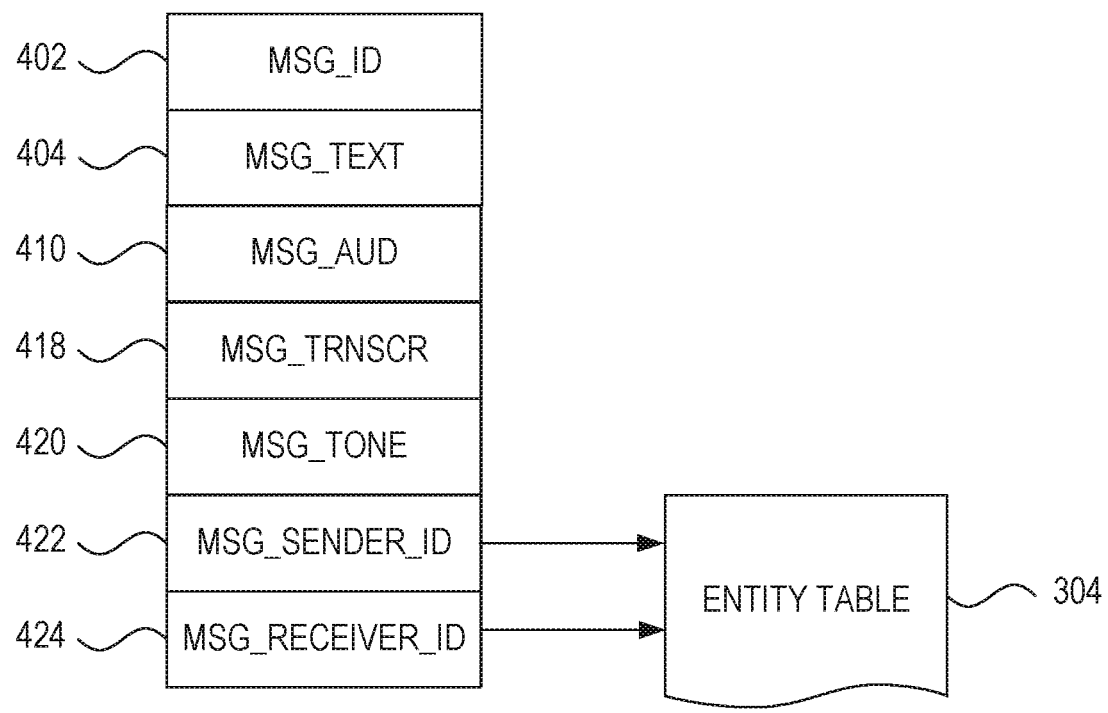
FIG. 4 is a diagrammatic representation of a message, in accordance with some examples.

FIG. 4 is a schematic diagram illustrating a structure of a message 400, according to some examples, generated by a messaging client application 104 for communication to a further messaging client application 104 or the messaging server 114. The content of a particular message 400 is used to populate the message table 302 stored within the database 120, accessible by the messaging server 114. Similarly, the content of a message 400 is stored in memory as "in-transit"

or "in-flight" data of the client device 102 or the application servers 112. A message 400 is shown to include the following example components:

- message identifier 402: a unique identifier that identifies the message 400.
- message text payload 404: text, to be generated by a user via a user interface of the client device 102, and that is included in the message 400.
- message audio payload 410: audio data, captured by a microphone or retrieved from a memory component of the client device 102, and that is included in the message 400.
- message audio transcription payload 418: audio transcription data, generated from audio captured by a microphone or retrieved from a memory component of the client device 102, and that is included in the message 400. It will be noted that, in some examples, the transcription of an audio is generated on demand, only if requested by a user at the recipient device.
- message audio tone payload 420: audio tone data, inferred from audio captured by a microphone or retrieved from a memory component of the client device 102, and that is included in the message 400.
- message sender identifier 422: an identifier (e.g., a messaging system identifier, email address, or device identifier) indicative of a user of the Client device 102 on which the message 400 was generated and from which the message 400 was sent.
- message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, values stored within the message sender identifier 422 and the message receiver identifier 424 may point to user records stored within an entity table 304. The value stored in the message audio payload 410 may point to a location in the persistent storage on the server storing the associated audio content captured by a microphone of the client device 102 in response to detecting activation of a user-selectable element configured commence recording of an audio message.

Time-Based Access Limitation Architecture

Figure 5:
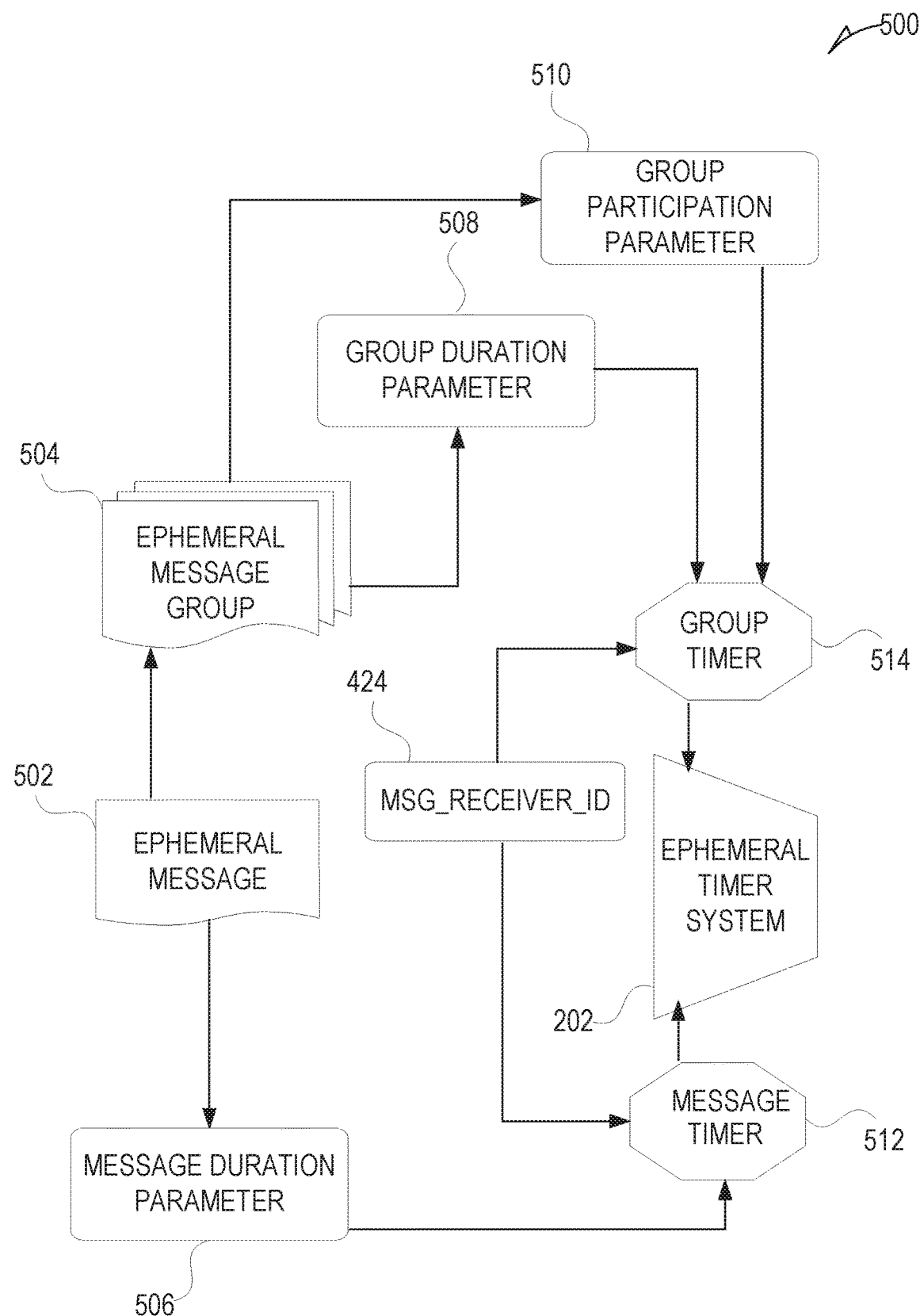
FIG. 5 is a flowchart for an access-limiting process, in accordance with some examples.

FIG. 5 is a schematic diagram illustrating an access-limiting process 500, in terms of which access to content (e.g., an ephemeral message 502, and associated multimedia payload of data) or a content collection (e.g., an ephemeral message group 504) may be time-limited (e.g., made ephemeral).

An ephemeral message 502 is associated with an identification of a sending user (MSG_SENDER_ID 422 of FIG. 4) and is shown to be associated with a message duration parameter 506, the value of which determines an amount of time that the ephemeral message 502 will be displayed to a receiving user of the ephemeral message 502 by the messaging client application 104. In one example, an ephemeral message 502 is viewable by a receiving user for up to a maximum of 10 seconds, depending on the amount of time that the sending user specifies using the message duration parameter 506. In some examples, where an ephemeral message 502 is a voice chat message, it may be available to a receiving user for viewing the associated transcription and for listening to the associated audio clip for longer periods of time, such as, 24 hours or until the vice chat message is deleted by the sending user. In some examples, the audio clip from a voice chat message is stored in the database 120 of FIG. 1 and is available to a receiving user for listening for a predetermined period of time but not after the sending user deletes the voice chat message.

The message duration parameter 506 and the message receiver identifier 424 are shown to be inputs to a message timer 512, which is responsible for determining the amount of time that the ephemeral message 502 is shown to a particular receiving user identified by the message receiver identifier 424, In particular, the ephemeral message 502 will only be shown to the relevant receiving user for a time period determined by the value of the message duration parameter 506, The message timer 512 is shown to provide output to a more generalized ephemeral timer system 202, which is responsible for the overall timing of display of content (e.g., an ephemeral message 502) to a receiving user.

The ephemeral message 502 is shown in FIG. 5 to be included within an ephemeral message group 504 (e.g., a collection of messages in a personal story, or an event story). The ephemeral message group 504 has an associated group duration parameter 508, a value of which determines a time duration for which the ephemeral message group 504 is presented and accessible to users of the messaging system 100. The group duration parameter 508, for example, may be the duration of a music concert, where the ephemeral message group 504 is a collection of content pertaining to that concert. Alternatively, a user (either the owning user or a curator user) may specify the value for the group duration parameter 508 when performing the setup and creation of the ephemeral message group 504.

Additionally, each ephemeral message 502 within the ephemeral message group 504 has an associated group participation parameter 510, a value of which determines the duration of time for which the ephemeral message 502 will be accessible within the context of the ephemeral message group 504. Accordingly, a particular ephemeral message group 504 may "expire" and become inaccessible within the context of the ephemeral message group 504, prior to the ephemeral message group 504 itself expiring in terms of the group duration parameter 508. The group duration parameter 508, group participation parameter 510, and message receiver identifier 424 each provide input to a group timer 514, which operationally determines, firstly, whether a particular ephemeral message 502 of the ephemeral message group 504 will be displayed to a particular receiving user and, if so, for how long. Note that the ephemeral message group 504 is also aware of the identity of the particular receiving user as a result of the message receiver identifier 424.

Accordingly, the group timer 514 operationally controls the overall lifespan of an associated ephemeral message group 504, as well as an individual ephemeral message 502 included in the ephemeral message group 504. In one example, each and every ephemeral message 502 within the ephemeral message group 504 remains viewable and accessible for a time period specified by the group duration parameter 508. In a further example, a certain ephemeral message 502 may expire, within the context of ephemeral message group 504, based on a group participation parameter 510. Note that a message duration parameter 506 may still determine the duration of time for which a particular ephemeral message 502 is displayed to a receiving user, even within the context of the ephemeral message group 504. Accordingly, the message duration parameter 506 determines the duration of time that a particular ephemeral message 502 is displayed to a receiving user, regardless of whether the receiving user is viewing that ephemeral message 502 inside or outside the context of an ephemeral message group 504.

The ephemeral timer system 202 may furthermore operationally remove a particular ephemeral message 502 from the ephemeral message group 504 based on a determination that it has exceeded an associated group participation parameter 510. For example, when a sending user has established a group participation parameter 510 of 24 hours from posting, the ephemeral timer system 202 will remove the relevant ephemeral message 502 from the ephemeral message group 504 after the specified 24 hours. The ephemeral tinier system 202 also operates to remove an ephemeral message group 504 when either the group participation parameter 510 for each and every ephemeral message 502 within the ephemeral message group 504 has expired, or when the ephemeral message group 504 itself has expired in terms of the group duration parameter 508.

In certain use cases, a creator of a particular ephemeral message group 504 may specify an indefinite group duration parameter 508. In this case, the expiration of the group participation parameter 510 for the last remaining ephemeral message 502 within the ephemeral message group 504 will determine when the ephemeral message group 504 itself expires. In this case, a new ephemeral message 502, added to the ephemeral message group 504, with a new group participation parameter 510, effectively extends the life of an ephemeral message group 504 to equal the value of the group participation parameter 510.

Responsive to the ephemeral timer system 202 determining that an ephemeral message group 504 has expired (e.g., is no longer accessible), the ephemeral timer system 202 communicates with the messaging system 100 (and, for example, specifically the messaging client application 104) to cause an indicium (e.g., an icon) associated with the relevant ephemeral message group 504 to no longer be displayed within a user interface of the messaging client application 104. Similarly, when the ephemeral timer system 202 determines that the message duration parameter 506 for a particular ephemeral message 502 has expired, the ephemeral timer system 202 causes the messaging client application 104 to no longer display an indicium (e.g., an icon or textual identification) associated with the ephemeral message 502.

It will be noted that access to content such as a voice chat may or may not be made ephemeral in the messaging system 100 of FIG. 1. As mentioned above, the audio content associated with a voice chat message may be available to a receiving user for listening as long as the sending user does not delete the voice chat message. Example operations performed by the voice notes system 208 of FIG. 2 are described below, with reference to FIG. 6.

Process Flow and User Interfaces

Figure 6:
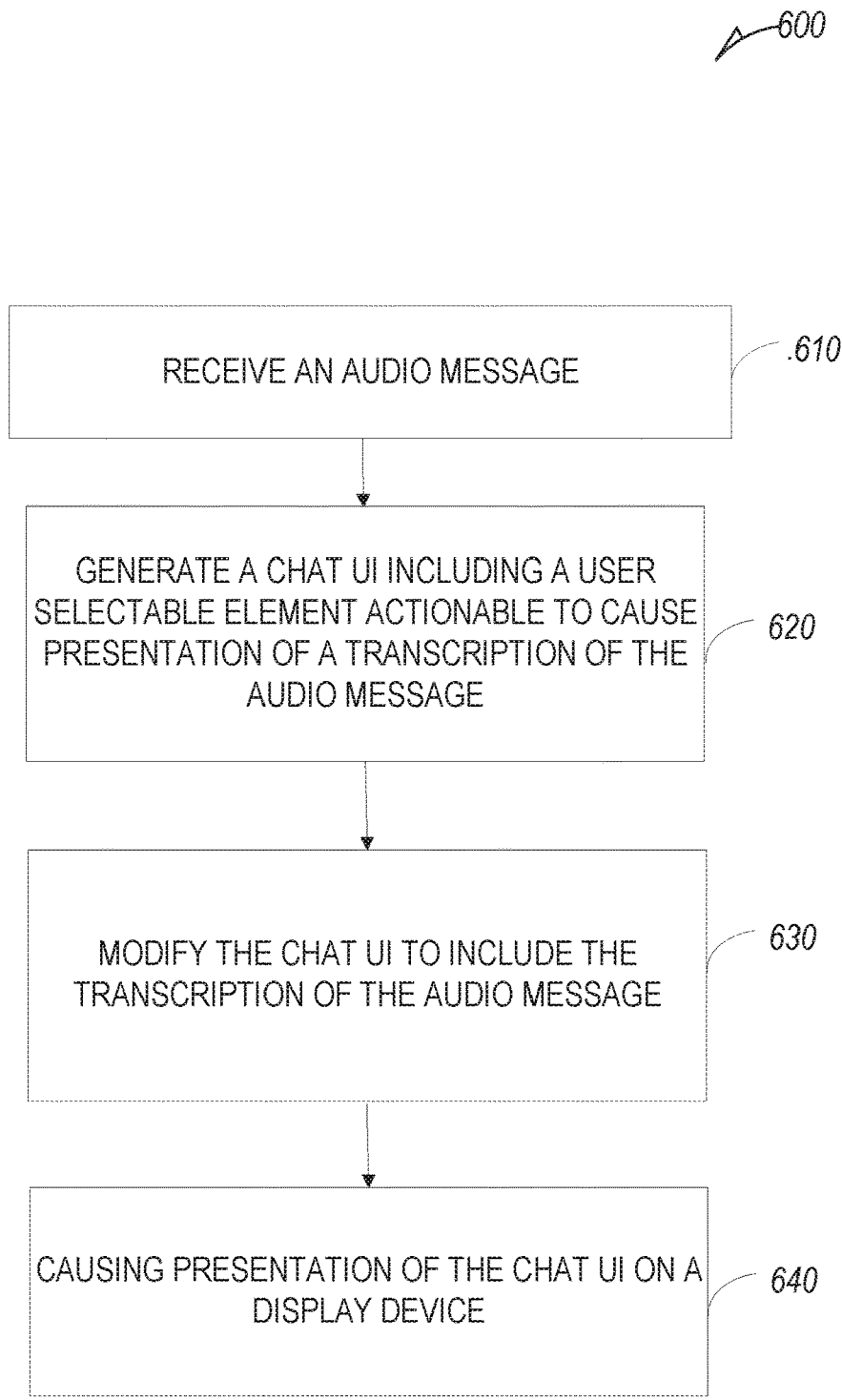
FIG. 6 is a flowchart of a method for serving voice notes in a format that permits access to the associated transcriptions, in accordance with some examples.
Figure 7:
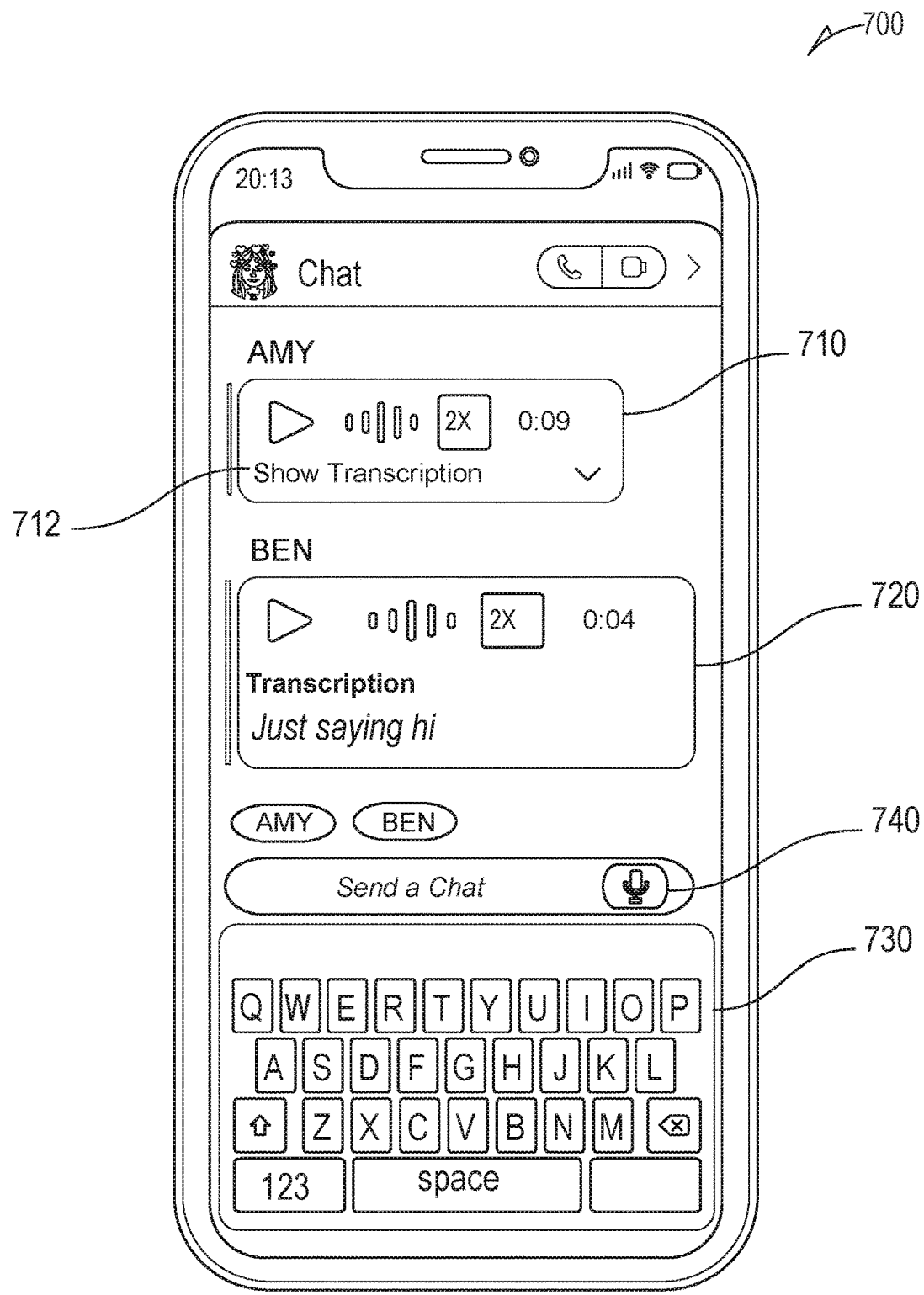
FIG. 7 is a diagram illustrating an example chat user interface (UI) that includes a voice note and an associated transcription, in accordance with some examples.

FIG. 6 is a flowchart of a method 600 for facilitating a voice chat between users of the messaging client application 104 of FIG. 1. In one example, some or all processing logic resides at the client device 102 of FIG. 1 and/or at the messaging server system 108 of FIG. 1. The method 600 commences at operation 610, when an audio message is received at a client device. In response to detecting the received audio message, at operation 620, the voice notes system generates a chat UI that includes a representation of the received audio message together with one or more associated user-selectable elements. One of the user-selectable elements associated with the representation of the received audio message is actionable to cause playing of the audio message. Another user-selectable element associated with the representation of the received audio message is actionable to cause presentation of a transcription of the received audio message. An example chat UI 700 that includes, in area 710, a representation of the received audio message together with several associated user-selectable elements, is shown in FIG. 7. The phrase "Show Transcription," identified by reference numeral 712, shown in the area 710, serves as the transcription user-selectable element actionable to cause presentation of a transcription of the associated audio message. The chat UI, in one example, is presented by a messaging client application executing at the recipient client device. The messaging client application is supported by a backend service of a messaging system for exchanging data over a network.

At operation 630, in response to detecting activation of the transcription user-selectable element, the voice notes system modifies the chat UI to include the transcription of the audio message. In some examples, the transcription is generated, e.g., by the voice notes system, in response to detecting activation of the transcription user-selectable element, such that there is no consumption of resources for transcription generation unless it is explicitly requested by a user by activating the transcription user-selectable element. The generated transcription may be stored in the database 120 of FIG. 1. In some examples, the voice notes system retrieves previously generated transcription from the database 120. At operation 640, the voice notes system, causes presentation of the chat UI on a display of the recipient client device. The chat UI may present a partial transcription of an audio message if, for example, the full transcription takes up more than a single line. In that case, the chat UI includes a user-selectable element actionable to request display of the full transcription and, in response to the request, display the full transcription in the chat UI.

Returning to FIG. 7, the area 710 includes a user-selectable element identified with "2X," which is actionable to cause playing of the audio message at a speed different from a normal play speed, in this case at double the normal play speed. The area 710 also includes an indication of the length of the audio message, which is 4 seconds in this example. The representation of a further audio message is shown in area 720, which includes the transcription that reads, "Just saying hi." The voice notes system may be configured to remove from the chat UI the transcription of the audio message, in response to detecting an action associated with the representation of another message.

Also displayed in the chat UI 700 is a virtual keyboard 730 for obtaining text input from a user and a microphone user-selectable element 740 actionable to initiate audio recording process for creating an audio message. For example, the audio recording process for creating an audio message may be initiated by press and hold gesture with respect to the microphone user-selectable element 740, in which case the recording is in progress while the hold gesture continues and stops when the hold gesture ends.

Figure 8:
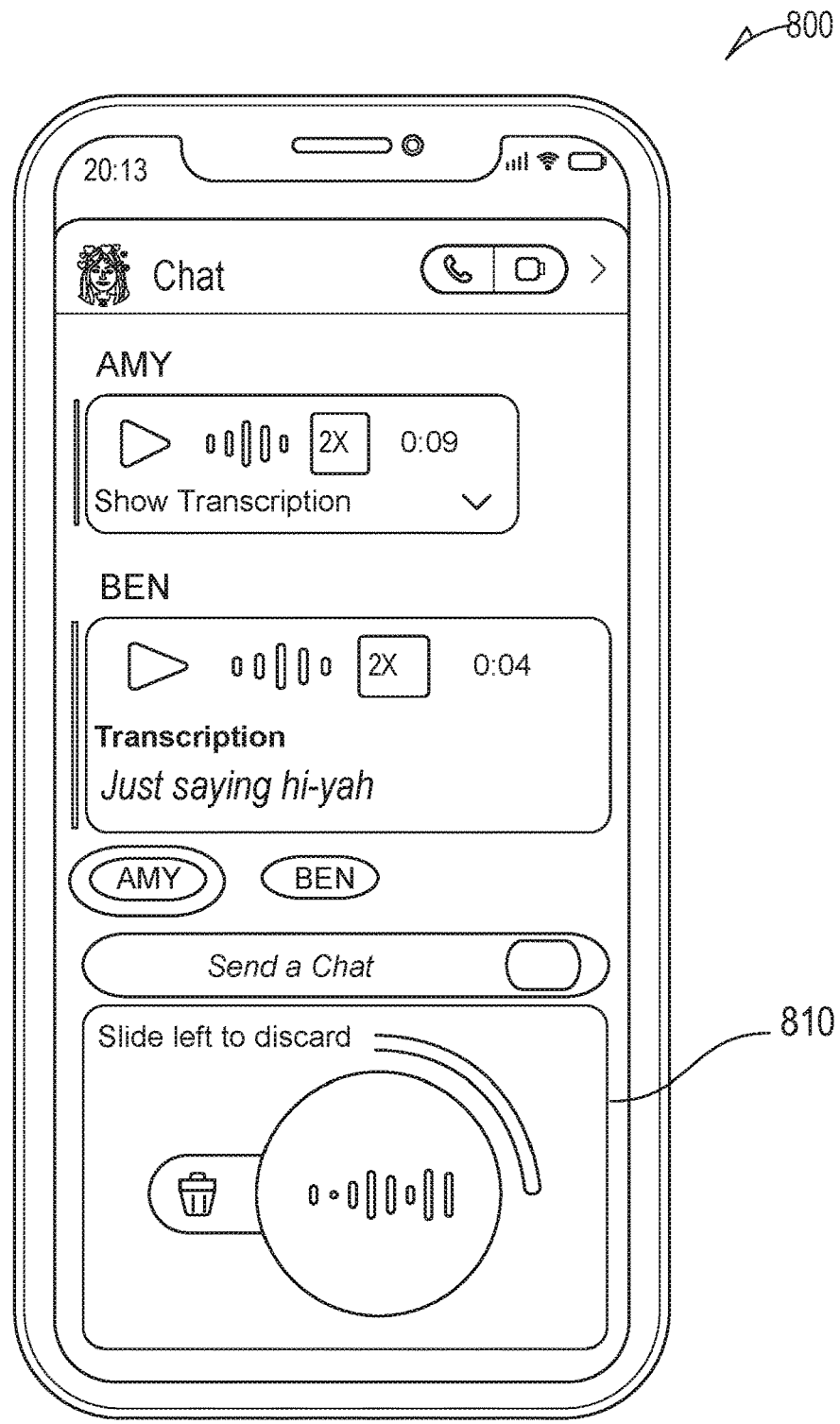
FIG. 8 is a diagram illustrating an example chat UI that includes a voice note tray, in accordance with some examples.

In some examples, the voice notes system is configured to replace the virtual keyboard with a voice note tray comprising one or more user-selectable elements for facilitating obtaining audio input from a user, in response to detecting the activation of the microphone user-selectable element in the chat UI by a tap gesture. The voice note tray, in some examples, includes a record user-selectable element actionable to commence recording of an audio message and a user-selectable element actionable to discard an audio message. In response to detecting activation of the record user-selectable element, the voice notes system commences capturing audio input, Based on the captured audio input, the voice notes system can generate a new audio message, which can be then communicated to a further client device. An example chat UI 800 that includes, in area 810, a voice note tray is shown in FIG. 8. The voice note tray is shown in the area 810 and indicates a recording process, which can be terminated by a sliding left gesture.

Machine Architecture

Figure 9:
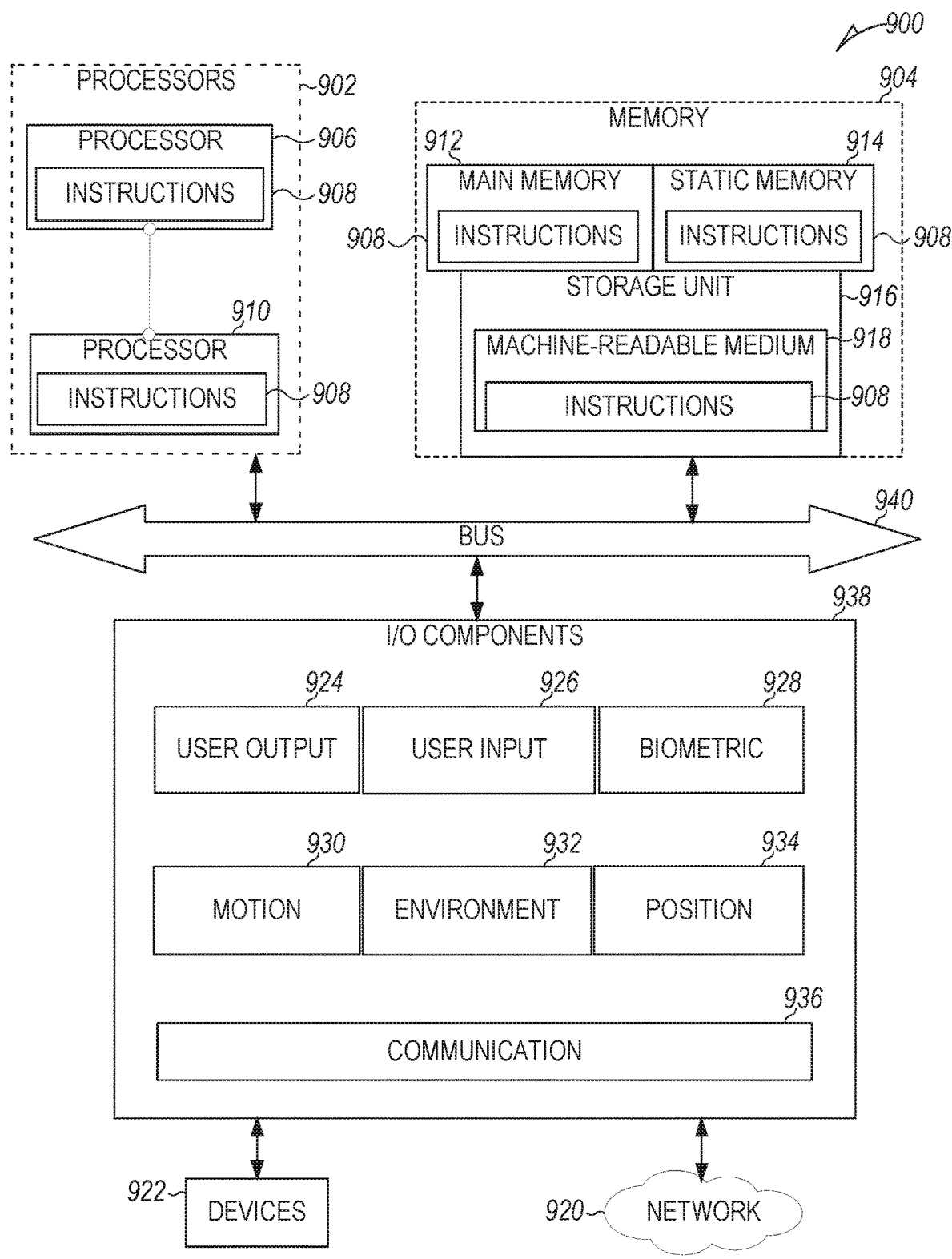
FIG. 9 is a diagrammatic representation of a machine in the form of a computer system within which a set of instructions may be executed for causing the machine to perform any one or more of the methodologies discussed herein, in accordance with some examples.

FIG. 9 is a diagrammatic representation of the machine 900 within which instructions 608 (e.g., software, a program, an application, an applet, an app, or other executable code) for causing the machine 900 to perform any one or more of the methodologies discussed herein may be executed. For example, the instructions 908 may cause the machine 900 to execute any one or more of the methods described herein. The instructions 908 transform the general, non-programmed machine 900 into a particular machine 900 programmed to carry out the described and illustrated functions in the manner described. The machine 900 may operate as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 908, sequentially or otherwise, that specify actions to be taken by the machine 900. Further, while only a single machine 900 is illustrated, the term "machine" shall also be taken to include a collection of machines that individually or jointly execute the instructions 908 to perform any one or more of the methodologies discussed herein. The machine 900, for example, may comprise the client device 102 or any one of a number of server devices forming part of the messaging server system 108. In some examples, the machine 900 may also comprise both client and server systems, with certain operations of a particular method or algorithm being performed on the server-side and with certain operations of the particular method or algorithm being performed on the client-side.

The machine 900 may include processors 902, memory 904, and input/output I/O components 938, which may be configured to communicate with each other via a bus 940. In an example, the processors 902 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 906 and a processor 910 that execute the instructions 908. The term "processor" is intended to include multi-core processors that may comprise two or more independent processors (sometimes referred to as "cores") that may execute instructions contemporaneously. Although FIG. 9 shows multiple processors 902, the machine 900 may include a single processor with a single-core, a single processor with multiple cores (e.g., a multi-core processor), multiple processors with a single core, multiple processors with multiples cores, or any combination thereof.

The memory 904 includes a main memory 912, a static memory 914, and a storage unit 916, both accessible to the processors 902 via the bus 940. The main memory 904, the static memory 914, and storage unit 916 store the instructions 908 embodying any one or more of the methodologies or functions described herein. The instructions 908 may also reside, completely or partially, within the main memory 912, within the static memory 914, within machine-readable medium 918 within the storage unit 916, within at least one of the processors 902 (e.g., within the Processor's cache memory), or any suitable combination thereof, during execution thereof by the machine 900.

The I/O components 938 may include a wide variety of components to receive input, provide output, produce output, transmit information, exchange information, capture measurements, and so on. The specific I/O components 938 that are included in a particular machine will depend on the type of machine. For example, portable machines such as mobile phones may include a touch input device or other such input mechanisms, while a headless server machine will likely not include such a touch input device. It will be appreciated that the I/O components 938 may include many other components that are not shown in FIG. 9. In various examples, the I/O components 938 may include user output components 924 and user input components 926. The user output components 924 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 926 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 938 may include biometric components 928, motion components 930, environmental components 932, or position components 934, among a wide array of other components. For example, the biometric components 928 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The mo9tion components 930 include acceleration sensor components (e.g., accelerometer), gravitation sensor components, rotation sensor components (e.g., gyroscope).

The environmental components 932 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 102 may have a camera system comprising, for example, front cameras on a front surface of the client device 102 and rear cameras on a rear surface of the client device 102. The front cameras may, for example, be used to capture still images and video of a user of the client device 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 102 may also include a 360° camera for capturing 360° photographs and videos.

Further, the camera system of a client device 102 may include dual rear cameras (e.g., a primary camera as well as a depth-sensing camera), or even triple, quad or penta rear camera configurations on the front and rear sides of the client device 102. These multiple cameras systems may include a wide camera, an ultra-wide camera, a telephoto camera, a macro camera and a depth sensor, for example.

The position components 934 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 938 further include communication components 936 operable to couple the machine 900 to a network 920 or devices 922 via respective coupling or connections. For example, the communication components 936 may include a network interface Component or another suitable device to interface with the network 920. In further examples, the communication components 936 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 922 may be another machine or any of a wide variety of peripheral devices (e.g., a peripheral device coupled via a USB).

Moreover, the communication components 636 may detect identifiers or include components operable to detect identifiers. For example, the communication components 636 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, Maxi Code, PDF417, Ultra Code, UCC RSS-2D bar code, and other optical codes), or acoustic detection components (e.g., microphones to identify tagged audio signals). In addition, a variety of information may be derived via the communication components 936, such as location via Internet Protocol (IP) geolocation, location via Wi-Fi® signal triangulation, location via detecting an NFC beacon signal that may indicate a particular location, and so forth.

The various memories (e.g., main memory 912, static memory 914, and memory of the processors 902) and storage unit 916 may store one or more sets of instructions and data structures (e.g., software) embodying or used by any one or more of the methodologies or functions described herein. These instructions (e.g., the instructions 908), when executed by processors 902, cause various operations to implement the disclosed examples.

The instructions 908 may be transmitted or received over the network 920, using a transmission medium, via a network interface device (e.g., a network interface component included in the communication components 936) and using any one of several well-known transfer protocols (e.g., hypertext transfer protocol (HTTP)). Similarly, the instructions 608 may be transmitted or received using a transmission medium via a coupling (e.g., a peer-to-peer coupling) to the devices 922.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN); a wide area network (WAN); a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example; the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard; others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 902 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API), The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals; and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A method comprising:
   receiving a first audio message at a recipient user device;
   causing presentation, on a display of the recipient user device, of a chat user interface (UI) including a first user-selectable element actionable to cause playing of the first audio message and a second user-selectable element actionable to cause presentation of a transcription of the first audio message, the first user-selectable element and the second user-selectable element being simultaneously presented in the chat UI;
   in response to detecting activation of the second user-selectable element:
      modifying the chat UI to include the transcription of the first audio message; and
      causing presentation of the modified chat UI on the display of the recipient user device, the first user-selectable element actionable to cause playing of the first audio message being presented in the modified chat UI simultaneously with the transcription of the first audio message; and
   in response to detecting activation of a third user-selectable element associated with a second audio message, removing the transcription of the first audio message from the modified chat UI.

2. The method of claim 1, comprising commencing generating of the transcription of the first audio message, in response to the detecting of activation of the second user-selectable element.

3. The method of claim 1, wherein the chat UI includes a fourth user-selectable element actionable to cause playing of the first audio message at a speed different from a normal play speed.

4. The method of claim 1, wherein the third user-selectable element is a partial transcription of the second audio message, the method further comprising causing presentation of a full transcription of the second audio message in response to the detecting the activation of the third user-selectable element.

5. The method of claim 1, wherein the chat UI includes a microphone user-selectable element actionable to initiate an audio recording process and a virtual keyboard for obtaining text input from a user, the method comprising:
   detecting activation of the microphone user-selectable element; and
   in response to detecting the activation of the microphone user-selectable element, replacing the virtual keyboard in the chat UI with a voice note tray, the voice note tray comprising one or more user-selectable elements for facilitating obtaining audio input from a user.

6. The method of claim 5, wherein the detecting of activation of the microphone user-selectable element is based on detecting a tap gesture directed to the microphone user-selectable element.

7. The method of claim 5, wherein the voice note tray includes a user-selectable element actionable to discard an audio message.

8. The method of claim 5, wherein the voice note tray includes a record user-selectable element actionable to commence recording of an audio message.

9. The method of claim 8, comprising:
   in response to detecting activation of the record user-selectable element, commencing capturing audio input;
   generating a new audio message based on the audio input; and
   communicating the new audio message to a second user device.

10. The method of claim 1, wherein the chat UI is presented by a messaging client application executing at the recipient user device, the messaging client application provided by a backend service of a messaging system for exchanging data over a network.

11. A system comprising:
    one or more processors; and
    a non-transitory computer readable storage medium comprising instructions that when executed by the one or more processors cause the one or more processors to perform operations comprising:
       receiving a first audio message at a recipient user device;
       causing presentation, on a display of the recipient user device, of a chat user interface (UI) including a first user-selectable element actionable to cause playing of the first audio message and a second user-selectable element actionable to cause presentation of a transcription of the first audio message, the first user-selectable element and the second user-selectable element being simultaneously presented in the chat UI;
       in response to detecting activation of the second user-selectable element:
          modifying the chat UI to include the transcription of the first audio message; and
          causing presentation of the modified chat UI on the display of the recipient user device, the first user-selectable element actionable to cause playing of the first audio message being presented in the modified chat UI simultaneously with the transcription of the first audio message; and
       in response to detecting activation of a third user-selectable element associated with a second audio message, removing the transcription of the first audio message from the modified chat UI.

12. The system of claim 11, wherein the operations caused by instructions executed by the one or more processors further include commencing generating of the transcription of the first audio message, in response to the detecting of activation of the second user-selectable element.

13. The system of claim 11, wherein the chat UI includes a fourth user-selectable element actionable to cause playing of the first audio message at a speed different from a normal play speed.

14. The system of claim 11, wherein the third user-selectable element is a partial transcription of the second audio message, the operations further comprising causing presentation of a full transcription of the second audio message in response to the detecting the activation of the third user-selectable element.

15. The system of claim 11, wherein the chat UI includes a microphone user-selectable element actionable to initiate an audio recording process and a virtual keyboard for obtaining text input from a user, the operations caused by instructions executed by the one or more processors further include:
   detecting activation of the microphone user-selectable element; and
   in response to detecting the activation of the microphone user-selectable element, replacing the virtual keyboard in the chat UI with a voice note tray, the voice note tray comprising one or more user-selectable elements for facilitating obtaining audio input from a user.

16. The system of claim 15, wherein the detecting of activation of the microphone user-selectable element is based on detecting a tap gesture directed to the microphone user-selectable element.

17. The system of claim 15, wherein the voice note tray includes a user-selectable element actionable to discard an audio message.

18. The system of claim 15, wherein the voice note tray includes a record user-selectable element actionable to commence recording of an audio message.

19. The system of claim 18, wherein the operations caused by instructions executed by the one or more processors further include:
   in response to detecting activation of the record user-selectable element, commencing capturing audio input; generating a new audio message based on the audio input; and
   communicating the new audio message to a second user device.

20. A machine-readable non-transitory storage medium having instruction data executable by a machine to cause the machine to perform operations comprising:
   receiving a first audio message at a recipient user device;
   causing presentation, on a display of the recipient user device, of a chat user interface (UI) including a first user-selectable element actionable to cause playing of the first audio message and a second user-selectable element actionable to cause presentation of a transcription of the first audio message, the first user-selectable element and the second user-selectable element being simultaneously presented in the chat UI;
   in response to detecting activation of the second user-selectable element:
      modifying the chat UI to include the transcription of the first audio message; and
      causing presentation of the modified chat UI on the display of the recipient user device, the first user-selectable element actionable to cause playing of the first audio message being presented in the modified chat UI simultaneously with the transcription of the first audio message; and
   in response to detecting activation of a third user-selectable element associated with a second audio message, removing the transcription of the first audio message from the modified chat UI.

* * * * *